(12) United States Patent
Koseski et al.

(10) Patent No.: US 8,359,886 B2
(45) Date of Patent: Jan. 29, 2013

(54) TREATMENT OF MELT QUENCHED ALUMINOSILICATE GLASS SPHERES FOR APPLICATION AS PROPPANTS VIA DEVITRIFICATION PROCESSES

(75) Inventors: Ryan P. Koseski, State College, PA (US); John R. Hellmann, State College, PA (US); Barry E. Scheetz, Lemont, PA (US)

(73) Assignee: The Penn State Research Foundation, University Park, PA (US)

( * ) Notice: Subject to any disclaimer, the term of this patent is extended or adjusted under 35 U.S.C. 154(b) by 187 days.

(21) Appl. No.: 12/534,548

(22) Filed: Aug. 3, 2009

(65) Prior Publication Data
US 2010/0068521 A1    Mar. 18, 2010

Related U.S. Application Data (60) Provisional application No. 61/097,734, filed on Sep. 17, 2008.

(51) Int. Cl.
*C03C 10/10* (2006.01)
(52) U.S. Cl. .......................... 65/33.7; 65/33.1
(58) Field of Classification Search ............... 65/33.1, 65/33.7
See application file for complete search history.

(56) References Cited

U.S. PATENT DOCUMENTS

| | | | |
|---|---|---|---|
| 3,030,215 A | | 4/1962 | Veatch et al. |
| 4,084,973 A | * | 4/1978 | Andrus et al. ............... 428/410 |
| 4,261,706 A | | 4/1981 | Blanding et al. |
| 4,395,271 A | * | 7/1983 | Beall et al. ...................... 65/31 |
| 5,964,911 A | * | 10/1999 | Morano et al. ................... 65/19 |
| 5,981,413 A | * | 11/1999 | Hale ............................. 501/32 |
| 6,057,257 A | * | 5/2000 | Morano et al. ................. 501/53 |
| 7,175,786 B2 | | 2/2007 | Celikkaya et al. |
| 7,648,934 B2 | * | 1/2010 | Shmotev et al. ............. 501/122 |
| 2004/0050098 A1 | | 3/2004 | Ball et al. |
| 2004/0148967 A1 | | 8/2004 | Celikkaya et al. |
| 2009/0082231 A1 | | 3/2009 | Shmotiev et al. |
| 2009/0192059 A1 | * | 7/2009 | Shmotev et al. ............. 507/271 |
| 2009/0288820 A1 | * | 11/2009 | Barron et al. ................. 166/249 |

* cited by examiner

*Primary Examiner* — Matthew Daniels
*Assistant Examiner* — Russell Kemmerle, III
(74) *Attorney, Agent, or Firm* — Gifford, Krass, Sprinkle, Anderson & Citkowsi, P.C.

(57) ABSTRACT

A process for increasing toughness of glass particulates is provided. The process includes providing an aluminosilicate glass particulate, the glass particulate generally having the form of a sphere, and heating the glass particulate to a temperature greater than 600° C. for a predetermined time. Thereafter, the glass particulate can be cooled to ambient temperature and the heating step can alter the failure mechanism of the glass particulate from a high energy failure that produces generally fine powder to a lower energy failure that produces generally large fragments. The glass particulate can be an amorphous glass particulate and may or may not have a nominal composition that corresponds to rhyolite, basalt, tholeiite, olivine and/or andesite.

9 Claims, 5 Drawing Sheets

TREATMENT OF MELT QUENCHED ALUMINOSILICATE GLASS SPHERES FOR APPLICATION AS PROPPANTS VIA DEVITRIFICATION PROCESSES

CROSS-REFERENCE TO RELATED APPLICATION

This application claims priority of U.S. Provisional Patent Application Ser. No. 61/097,734 filed Sep. 17, 2008, which is incorporated herein in its entirety by reference.

FIELD OF THE INVENTION

The present invention relates generally to a process for increasing the toughness of glass particulates and, in particular, to increasing the toughness of glass particulates that can be used as proppants.

BACKGROUND OF THE INVENTION

A hydrofracturing process, also known as "hydrofracing", can be used for stimulating oil/gas well production and entails pumping a viscous hydraulic liquid (known in the industry as a "pad") into a well. The intent of the hydrofracing is to fracture geologic formations and expose isolated beds of hydrocarbons around the well, thereby increasing per well volumes of extractable material such as oil, natural gas, etc.

Following or concurrent with an initial liquid injection, a slurry of surfactants, acids, and solid particles typically having diameters between 500-2000 microns is added to the well. The purpose of this slurry is to selectively open, clean and finally prop open the resultant fractures, with the particulates commonly referred to as proppants.

Proppants in the slurry remain in an appropriate location after the release of a fracturing pressure. With down well pressures often greater than 5000 pounds per square inch, cleaning and re-fracturing of wells incurring extremely high costs and the extractable materials back-flowing through the remaining proppants, the particulates must exhibit suitable strength, reliability and permeability.

A wide range of proppant materials have been used over the years in hydrofracturing, ranging from ground walnut hulls and Ottawa White Sands to synthetic materials comprised of high alumina content kaolin and bauxite ores which have been processed into roughly spherical form via relatively expensive high temperature sintering routes. For example, U.S. Patent Application Publication No. 2004/0148967 by Celikkaya et al. discloses a method of making ceramic particles that have an average hardness of at least 13 gigapascals using a glass that contains at least 35 weight percent $Al_2O_3$. In addition, the hydrofracturing industry continues to seek stronger, lower specific weight and cheaper alternatives to enhance the efficiency and lower the costs of stimulating oil/gas wells.

Proposed key features or properties of suitable proppants are: low cost; high strength and high degree of sphericity to promote flow and dispersion in the fracing pad; low specific gravity to mitigate settling during placement; and highly reliable failure behavior to promote maximum well permeability. For example, U.S. Patent Application Publication No. 2009/0082231 by Shmotiev et al. has disclosed a method for increasing the strength of glass spheres for producing a proppant, the proppant having at least 40 percent crystalline phase.

Glass spheres are an attractive candidate for use as proppants based on their commercial abundance, ease of manufacture, low cost, and high strength. Candidate materials that meet most of the proppant requirements are spheroidized glass manufactured from industrial byproduct waste streams such as mixed glass cullet, rhyolite, basalt, tholeiite, olivine and/or andesite. However, the utility of glass spheres produced from such raw materials has been hampered by their propensity to fail energetically and catastrophically into small fragments, which effectively "blind" the well. Currently, the use of glass, natural or otherwise, is not practiced for this reason. As such, a process for producing relatively inexpensive and yet adequate proppant particulates would be desirable.

SUMMARY OF THE INVENTION

A process for increasing toughness of glass particulates is provided. The process includes providing a glass particulate, the glass particulate generally having the form of a sphere, and heating the glass particulate to a temperature greater than 600° C. for a predetermined time. Thereafter, the glass particulate can be cooled to ambient temperature and the heating step can alter the failure mechanism of the glass particulate from a high energy failure that produces generally fine powder to a lower energy failure that produces generally large fragments. The glass particulate can be an amorphous glass particulate and may or may not have a nominal composition that corresponds minerals such as rhyolite, basalt, tholeiite, olivine and/or andesite. In particular, the glass particulate can be a product of an industrial byproduct waste stream.

The step of heating the glass particulate can include heating to a temperature between 700° C. and 1050° C., inclusive. The heating of the glass particulate can nucleate and grow a crystalline phase which may nor may not be an iron oxide which, upon which other phases can be grown to alter fracture toughness and morphology. In some instances, the step of heating the glass particulate can produce a proppant that has a fracture toughness at least 10% greater than the glass particulate before it has been heated. In other instances, the fracture toughness of the proppant can be at least 25% greater than a non-process glass particulate and in still other instances the fracture toughness can be at least 50% greater than a non-process glass particulate.

A proppant made from glass is also disclosed. The proppant is a glass particulate that has a generally spherical shape and a diameter within the range of 250 to 5000 microns, or in the alternative, a diameter within the range of 500 to 2000 microns. In addition, the proppant has improved failure properties with a Vickers indentation fracture resistance (VIFR) greater than 1.2 MPa·$\sqrt{m}$. The VIFR can be determined by the expression VIFR=0.1706(H·$\sqrt{a}$)·Log(4.5a/c) where H is a Vickers hardness value of the glass particulate, a is a diagonal length of an indentation produced on a surface of the glass particulate from a Vickers hardness test and c is a length of a crack extending from the indentation. In some instances, the VIFR for the proppant is greater than 1.5 MPa·$\sqrt{m}$ and in other instances the VIFR is greater than 1.8 MPa·$\sqrt{m}$.

DETAILED DESCRIPTION OF THE INVENTION

A process for tailoring mechanical properties, failure mechanisms and resultant fragment morphologies in glass spheres is disclosed. The glass spheres can be used as proppants in hydrofractured oil and natural gas wells. The process mitigates the propensity of conventional glass spheres to fail energetically and catastrophically into fine particulates under multiaxial compressive loading, thereby resulting in enhanced permeability and extraction efficiency in packed proppant beds. As such, the process has utility for producing proppants.

The process can employ a heat treatment after net-shape forming of glass spheres and can manipulate crystallinity of a resultant devitrified glass. The heat treatment can exploit changes in the microstructure of the glass spheres and thereby affect the mechanical properties that dictate the failure of the spheres under multi-axial loading—such as those present in hydrofractured oil/gas wells. The glass spheres can be processed such that failure under load results in the formation of larger fragments compared with the failure of untreated glass spheres, the larger fragments preventing "blinding" of packed proppant beds and thereby prolonging requisite fluid permeability and well production.

Tailoring of the crystallinity of the glass spheres and thus the crack interaction with the sphere microstructure can be intentionally controlled. As such, increasing the fracture resistance of the glass through crack deflection, bifurcation and crack bridging can be accomplished and the fracture properties deviated from high energetic failure of vitreous glass into fine powder to failure behavior of synthetic ceramics into two to five larger fragments. The net result can be prolonged production of oil/gas wells which have been hydrofractured with significantly reduced material and processing costs of the proppant, the proppants currently accounting for up to two-thirds of the total hydrofracturing cost.

Applying the process to natural obsidian-like glass spheres derived from minerals such as rhyolite, basalt, tholeiite, olivine and/or andesite, or similar compositions, can afford a glass-ceramic with magnetite, pyroxene, and plagioclase feldspar crystalline phases existing in a glass matrix of similar composition to the initial glass. The heat treatment can significantly enhance fracture resistance, also known as toughness, of the glass spheres and is not specifically aimed at enhancing or debilitating the strength of the spheres. The fracture resistance is enhanced by manipulation of the glass microstructure such that the growth of a limited number of critical cracks prior to ultimate failure is promoted, and in so doing, deflection, bridging and bifurcation of the cracks affords dissipation of energy in an ultimate failure process with less energetic destruction. The less energetic final failure promotes fracture of the glass spheres into fragments that are a significant portion of the full sphere size, thereby reducing the extent of comminution and packed bed blinding. As such, a relatively inexpensive and readily available material (e.g. rhyolite, basalt, tholeiite, olivine, andesite and/or other minerals of similar composition) can be used in applications that currently require the use of expensive materials such as sintered aluminosilicate (kaolinite and bauxite) based aggregate particles.

For example and for illustrative purposes only, the process can use andesite as a raw material, and in some instances, andesite having a nominal composition as shown in Table 1 is available as a waste byproduct of mining in the south central United States. It is appreciated that as delivered from the mine, the mineral can be described as Rhyolite based on the surrounding geology, however it is described in this invention by its composition which is defined in geologic literature as andesite. In the alternative, other underutilized aluminosilicate minerals, which can be found in a variety of geologic deposits, can also be employed in lieu of andesite. Such alternate minerals can include rhyolite, basalt, tholeiite and/or olivine having a nominal composition range in weight percent (wt %) of 49-59 $SiO_2$, 10-20 $Al_2O_3$, 0.5-4.5 $Fe_2O_3$, 3-13 FeO, 0-10 MgO, 0-16 CaO, 0-7 $Na_2O$, 0-4 $K_2O$, 0-4 $TiO_2$, 0-1 MnO, 0-1 $P_2O_5$, plus the presence of trace and/or minor quantities of other transition metal oxides, residual water and/or sulphates.

It is appreciated that the stated compositional range(s) of the iron oxide species and/or the ratio of $Fe_2O_3$/FeO can be dependent on the analytical technique used to characterize the material. For example, the total iron content can be included in the $Fe_2O_3$ content as shown in Table 1 below. In addition, the conditions used in fusing the glass material, for example using confectioner's sugar instead of $Na_2SO_4$, can change and/or alter the oxidation state of the iron and thereby affect the amount of the various iron oxide species that are present in the glass particulates.

TABLE 1

| Element | As-Received | Melt (Alumina Crucible) | Melt (Graphite Crucible) |
|---|---|---|---|
| $SiO_2$ (wt %) | 56.04 | 57.87 | 58.21 |
| $Al_2O_3$ (wt %) | 12.67 | 13.33 | 13.32 |
| $Fe_2O_3$ (wt %) | 10.4 | 11.32 | 10.62 |
| MnO (wt %) | 0.171 | 0.185 | 0.187 |
| MgO (wt %) | 3.33 | 3.57 | 3.59 |
| CaO (wt %) | 4.65 | 5.07 | 5.03 |
| $Na_2O$ (wt %) | 3.66 | 3.73 | 4.22 |
| $K_2O$ (wt %) | 2.38 | 2.44 | 2.44 |
| $TiO_2$ (wt %) | 2.19 | 2.297 | 2.302 |
| $P_2O_5$ (wt %) | 0.36 | 0.38 | 0.37 |
| LOI (wt %) | 3.915 | 0.138 | −1.129 |
| Total (wt %) | 99.76 | 100.3 | 99.16 |

The andesite, as-received or admixed with 1 wt % fining agent, can be fused at temperatures between 1400° C. and 1550° C. Different fining agents can be used which manipulate the oxidation state of several oxide species in the melt and the subsequent glass, most notably iron oxides. The adjustment of oxidation state is noted due to the role that iron oxide species can play as epitaxial nuclei, discussed in greater detail below. Glass with a nominal composition as shown in Table 1, with or without a fining agent, can be workable in the temperature range of generally 1200 to 1550° C. It is appreciated that glass viscosity is strongly temperature and/or compositionally dependant and slightly altered glass compositions can require a different range of temperatures to promote spheroidization.

Figure 1:
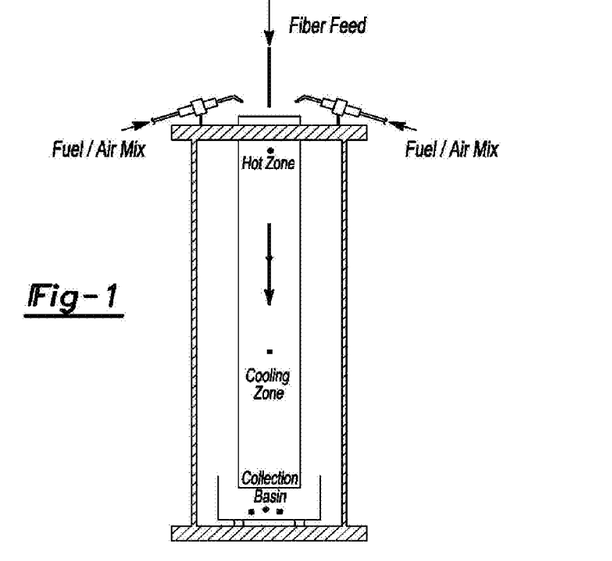
FIG. 1 is a schematic diagram illustrating a flame spheroidization tower.

The andesite glass particulates can be formed or produced using any method known to those skilled in the art, including commercial glass spheroidization techniques. For example and for illustrative purposes only, a flame spheroidization tower 10 as shown in FIG. 1 can be used to produce desirable particulates. As such, melting drawn fiber using an oxy-acetylene torch can afford for melt droplets to spheroidize via surface tension as they drop through the tower, thereby resulting in glass spheres to gather and be collected at the bottom thereof. In addition, size fractionation using conventional sieving technology can be employed. For example, 20/40 and 12/20 fractions are routinely used to provide desirably sized proppants.

Following net shaping of the glass spheres, the andesite can be heat treated at temperatures below the melting point of the material. For example, such treatment can generally range from 600° C. to 1000° C. in air, with soaking in this range for hours at temperatures from 600° C. to 1000° C. in 50° C. intervals, with the manipulation of the oxidation state of nucleating iron oxide species afforded by the heat treatment process shown in the figure.

It is appreciated that the atmosphere in which the nucleation and heat treatment is applied can also be controlled, and the atmosphere can affect the nucleating phase morphology and/or growth rate of crystalline species during the process. In this manner, further optimization of the mechanical properties and fracture habit of the glass particulates can be obtained.

Figure 4:
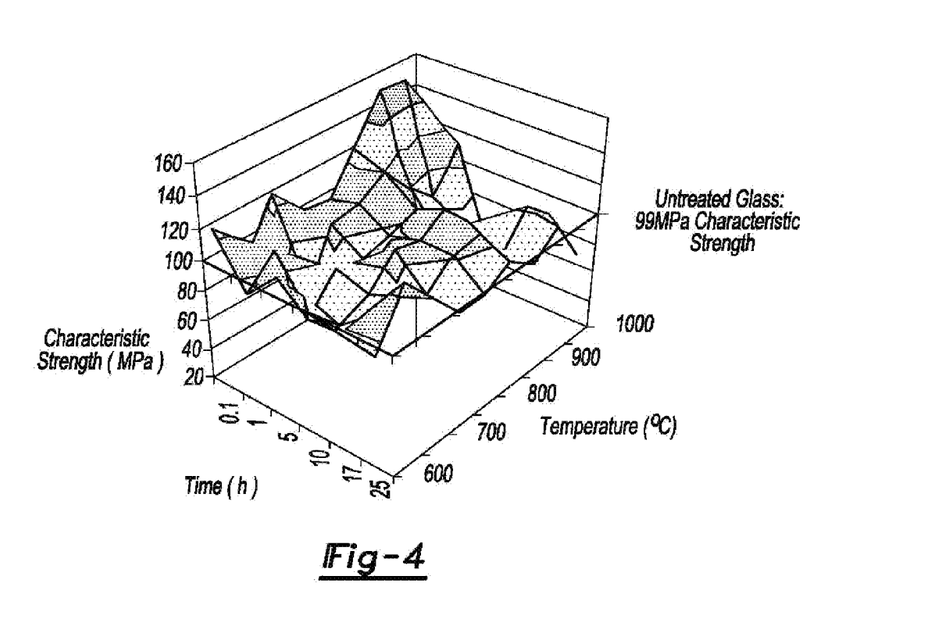
FIG. 4 illustrates a response surface for the results of characteristic strength measurements of glass-ceramic proppant processed for varying times and temperatures.

The strength of individual proppants as a function of process parameters can be measured using diametral compression. In addition, Weibull statistical analysis can be applied to determine the characteristic failure strength and strength variability. Results from devitrified proppants of the same nominal diameter as a function of heat treatment time and temperature are presented in Table 2. In particular, the table provides characteristic strength values in megapascals (MPa) for glass-ceramic proppant particles subjected to various process parameters. In comparison, the as-received (AR) characteristic strength for amorphous glass spheres is 99 MPa. The values within parenthesis show the 95% uncertainty boundary/value. FIG. 4 illustrates a three-dimensional plot of the data shown in Table 2.

TABLE 2

| | AR = 99 (13.5) | | | | | |
|---|---|---|---|---|---|---|
| | Time (h) | | | | | |
| Temp. (C.) | 0.1 | 1 | 5 | 10 | 17 | 25 |
| 1000 | 82 (13.5) | 111 (13.5) | 53 (9.5) | 72 (15.0) | 87 (15.0) | 68 (9.0) |
| 950 | 154 (25.5) | 84 (7.5) | 71 (11.5) | 69 (8.5) | 101 (18.0) | 97 (12.0) |
| 900 | 155 (31.0) | 100 (17.0) | 74 (12.0) | 92 (16.5) | 79 (12.0) | 82 (13.5) |
| 850 | 127 (18.5) | 121 (16.5) | 103 (21.0) | 113 (23.0) | 104 (20.0) | 95 (16.5) |
| 800 | 103 (15.5) | 109 (18.5) | 97 (16.0) | 102 (16.5) | 101 (22.0) | 85 (10.0) |
| 750 | 105 (18.5) | 105 (25.0) | 92 (15.0) | 107 (18.5) | 86 (14.5) | 85 (16.5) |
| 700 | 126 (23.5) | 76 (15.5) | 96 (18.5) | 89 (11.5) | 97 (22.5) | 106 (21.5) |
| 650 | 96 (19.0) | 110 (26.5) | 74 (8.0) | 80 (10.0) | 97 (19.0) | 127 (26.0) |
| 600 | 124 (21.0) | 93 (15.0) | 114 (19.5) | 100 (13.5) | 98 (12.5) | 94 (16.0) | extended periods of time promoting growth of a crystalline phase or phases. For example, using x-ray diffraction (XRD), magnetite ($Fe_3O_4$) and pyroxenes in an augite ($(Ca,Mg,Al,Fe,Ti)_2(Si,Al)_4O_6$) solid solution mineral family, as well as albite like plagioclase feldspars ($Na(AlSi_3)O_8$) that appear at higher temperatures have been identified in the particulates after treatment.

In some instances, crystalline phases can be nucleated at 650° C. for three hours to promote homogenous nucleation. Crystallization of $Fe_3O_4$ at constant temperatures between 600° C. and 1000° C. for times between 0.1 hours and 25 hours has been observed; however, at higher temperatures, higher oxidation state species of iron oxide, such as hematite ($Fe_2O_3$) appear. It is appreciated that temperature ranges for nucleation and subsequent heat treatment can be estimated using differential thermal analysis (DTA).

Figure 2:
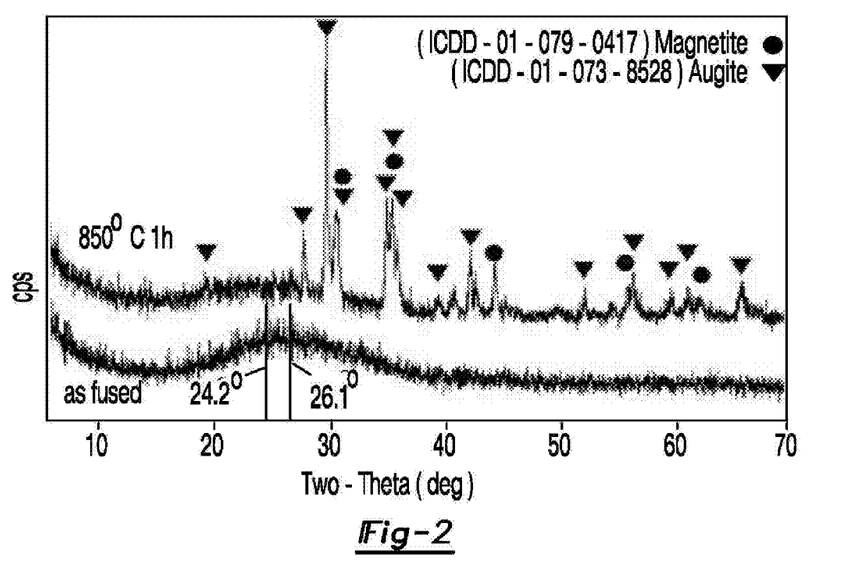
FIG. 2 illustrates an XRD scan identifying reflection peaks for crystalline phases as a mixture of magnetite and augite, and an amorphous peak.
Figure 3:
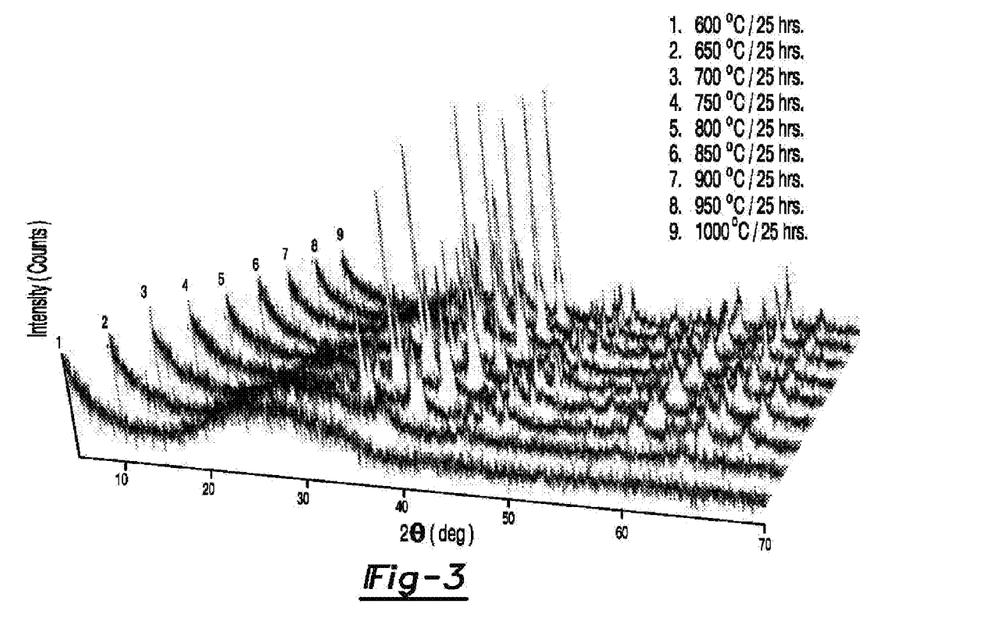
FIG. 3 illustrates sorted XRD scans of glass-ceramic heat treated for 25 hours at temperatures from 600° C. to 1000° C. in 50° C. intervals.

Collected XRD patterns are shown in FIGS. 2 and 3. In particular, peaks for a mixture of magnetite and augitite, as well as an amorphous peak are shown in FIG. 2, while FIG. 3 illustrates the temperature dependence of the growth of crystalline species within glass particulates heat treated for 25

As shown in Table 2 and FIG. 4, the strength of the proppant is affected by process parameters and the resulting crystalline phase nucleation and/or growth. For certain parameters (e.g. 900° C., 0.1 h) the strength is improved dramatically. In addition, the Weibull modulus describing the breadth of the failure probability distribution is not significantly affected and is in the range 1.6±0.4-3.1±0.8 for the characteristic strengths reported. As such, there does not appear to be a trend in the modulus as a function of time or temperature.

Figure 5:
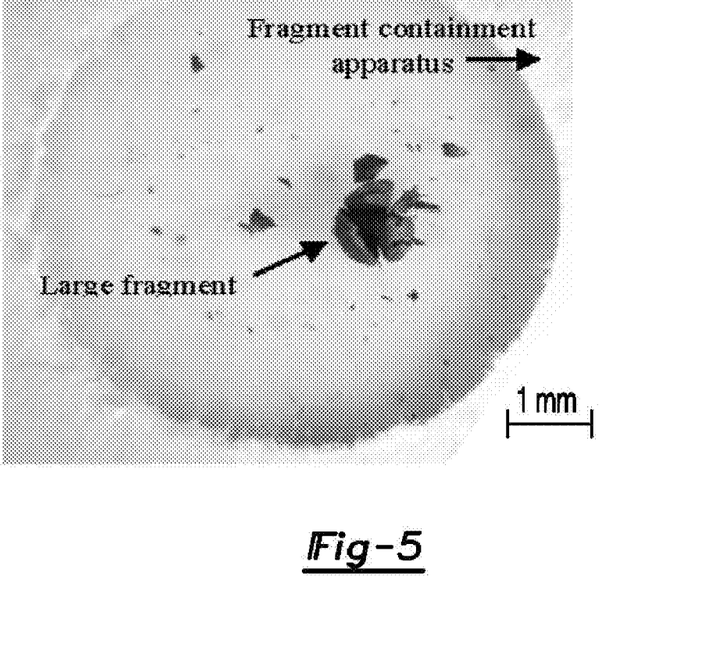
FIG. 5 is an optical image of a commercial proppant fractured in diametral compression.
Figure 6:
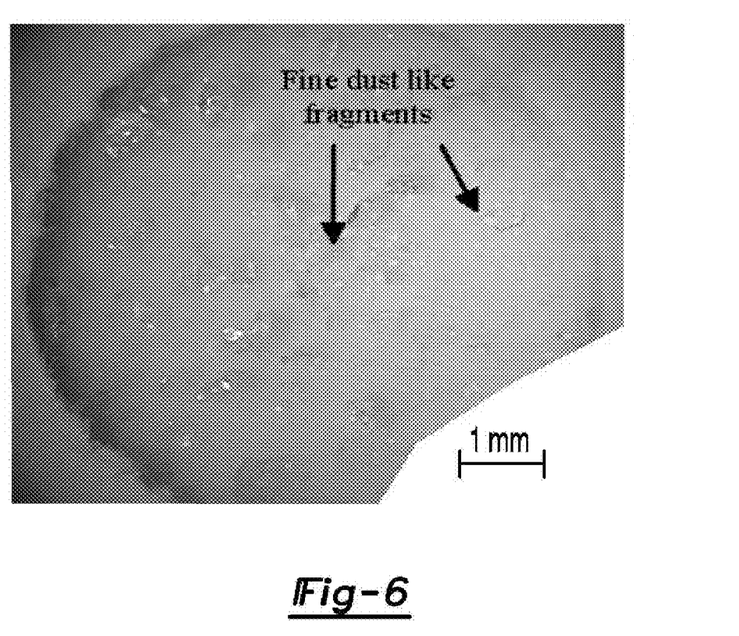
FIG. 6 is an optical image of a soda lime silicate (SLS) glass sphere fractured in diametral compression.

While the characteristic strength of individual proppants does show a time-temperature effect, the process also manipulates the fracture habit of individual proppants in compression. To quantify this manipulation, fragmentation of individual proppants is categorized as Type 1 or Type 2. As shown in FIG. 5, a leading commercially available proppant can exhibit a failure habit defined as Type 1 where large fragments are produced where Type 1 can be defined as a failure where a proppant fails or breaks up into two to five large fragments—large fragments being defined as a fragment that is at least 10% of the total size or volume of the original particulate. In contrast, FIG. 6 illustrates common soda-lime-silicate glass fails in a manner defined as Type 2 where fine dust-like fragments are produced.

Figure 7:
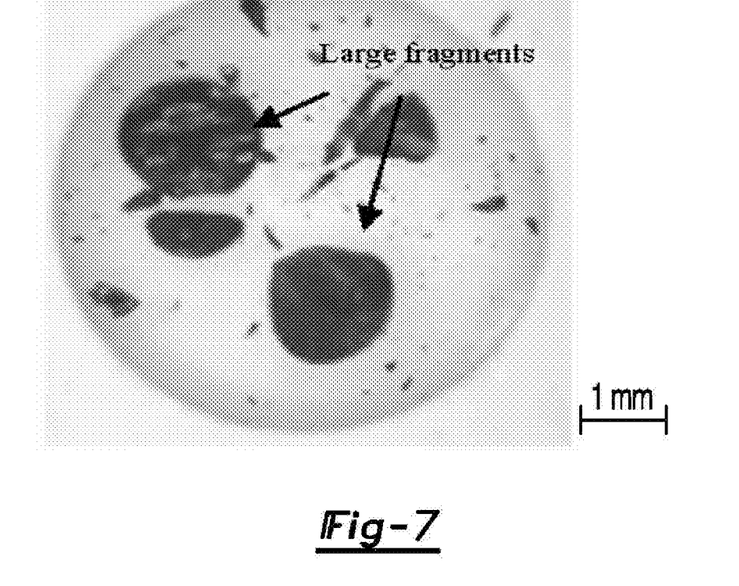
FIG. 7 is an optical image of a "Type 1" failure, characterized by larger fragments of significant portions of the full proppant.
Figure 8:
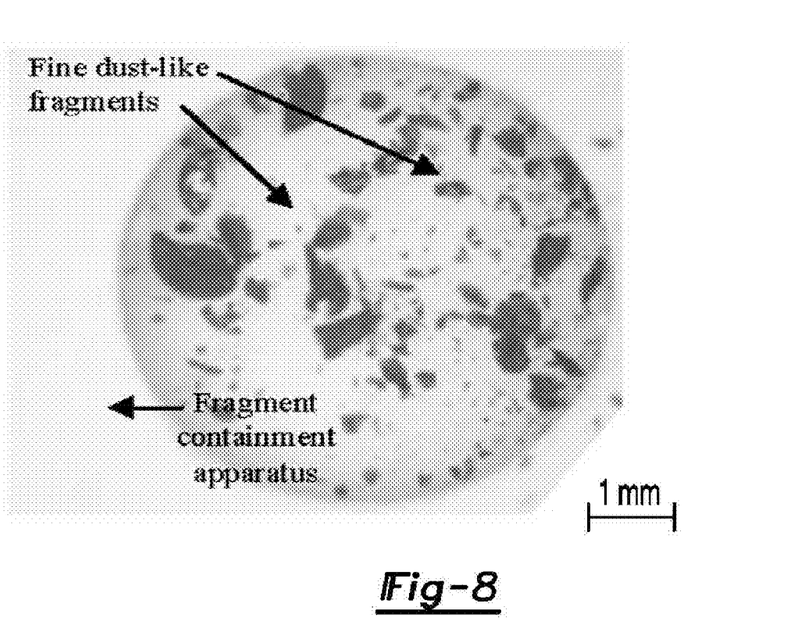
FIG. 8 is an optical image of a "Type 2" failure, characterized by small fragments indicative of a high energy, typical glass proppant failure.

It is appreciated that devitrified andesite spheres according to one or more embodiments of the present invention can fail in either a Type 1 or a Type 2 manner depending on the crack propagation, and the degree and characteristics of the crystallinity. For example, FIG. 7 illustrates a Type 1 failure and FIG. 8 illustrates a Type 2 failure for two andesite spheres having been exposed to two different processing routes.

Using the Type 1/Type 2 failure categorization technique, a percentage of each type of failure can be determined for a statistically significant number of samples, e.g. 40 proppants per parameter combination. Table 3 is a compilation of the percentage of 40 proppants that failed in the desired Type 1 fashion for each of the processing parameter combinations shown in the table. An as-received (AR) value of 40% was determined for amorphous proppants and is also shown in Table 3. The table illustrates the positive affects of the process on the failure habit of proppants by favoring Type 1 failure when compared to untreated glass spheres.

TABLE 3

% Type 1

| Temp. (C.) | Time (h) | | | | | |
|---|---|---|---|---|---|---|
| | 0.1 | 1 | 5 | 10 | 17 | 25 |
| 1000 | 77.5 | 70 | 82.5 | 82.5 | 80 | 75 |
| 950 | 62.5 | 85 | 75 | 87.5 | 85 | 82.5 |
| 900 | 52.5 | 80 | 87.5 | 85 | 85 | 85 |
| 850 | 65 | 67.5 | 77.5 | 82.5 | 82.5 | 80 |
| 800 | 65 | 62.5 | 65 | 77.5 | 67.5 | 70 |
| 750 | 67.5 | 60 | 60 | 57.5 | 60 | 67.5 |
| 700 | 42.5 | 40 | 35 | 32.5 | 37.5 | 42.5 |
| 650 | 47.5 | 47.5 | 27.5 | 35.9 | 50 | 40 |
| 600 | 50 | 42.5 | 32.5 | 47.5 | 40 | 40 |

AR = 40

Figure 9:
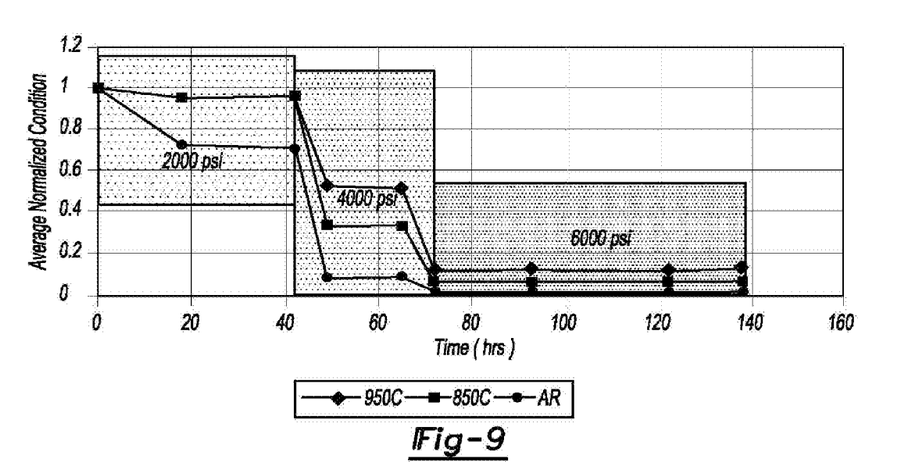
FIG. 9 is a graph illustrating the results of an API 61 conductivity test comparing the performance of two devitrified andesite proppants (950° C., 850° C.) with a non-heat treated or as-received (AR) andesite proppant.

As fracture of the glass ceramic proppants occurs in predominately larger fragments than the parent glass, a lower incidence of blinding of packed particle beds, comparable to the more expensive sintered bauxite proppants can result. To test the proppant performance, a standard American Petroleum Institute test, recommended practice API 61, can be applied. The API 61 test measures the conductivity under simulated operating conditions of a packed bed of proppants. Results for two processed devitrified andesite proppants and one untreated amorphous andesite proppant are shown in FIG. 9. The "950C" sample was heat treated at 950° C. for 0.1 hour, the "850C" sample was heat treated at 850° C. for 1 hour and the "AR" sample was tested as received with no heat treatment.

The API 61 test results illustrate that glass spheres heat treated according to an embodiment of the present invention exhibit improved physical and mechanical properties when compared to non-processed material. The 950C and 850C samples exhibited a 56% and 69% increase, respectively, in Type 1 fragmentation over the as-received particulates (Table 3). In contrast, the 950C and 850C samples exhibited a 56% and 22% increase, respectively, in strength over the as-received particulates (Table 2). In fact, the 850C proppants exhibited strength within error of the as-received sample, thereby illustrating that while strengthening of the proppant appears to aid in conductivity, the fragmentation significantly improves performance even when strength does not increase. As such, it is appreciated that a strength criterion for a particulate may not be sufficient to explain and/or predict performance as a proppant.

The proppants were also subjected to a Vickers indentation fracture test. Cross sectioned proppants were indented using a standard Vickers indenter, and the hardness (H) recorded. The hardness values in gigapascals (GPa) of the proppants determined in this manner are shown in Table 4 with the values within parenthesis being the standard deviation of a plurality of measurements.

TABLE 4

H (GPa)

| Temp. (C.) | Time (h) | | | | | |
|---|---|---|---|---|---|---|
| | 0.1 | 1 | 5 | 10 | 17 | 25 |
| 1000 | 5.33 (0.16) | 6.02 (0.14) | 6.12 (0.08) | 5.97 (0.37) | 6.38 (0.09) | 6.46 (0.14) |
| 950 | 5.79 (0.04) | 5.94 (0.22) | 6.00 (0.04) | 5.99 (0.10) | 6.54 (0.12) | 5.76 (0.16) |
| 900 | 6.22 (0.04) | 6.26 (0.70) | 6.33 (0.03) | 6.43 (0.03) | 6.01 (0.11) | 6.50 (0.03) |
| 850 | 6.13 (0.03) | 6.40 (0.11) | 6.53 (0.05) | 6.22 (0.07) | 6.28 (0.06) | 6.35 (0.10) |
| 800 | 5.68 (0.04) | 6.36 (0.03) | 6.20 (0.03) | 6.65 (0.09) | 6.57 (0.10) | 6.47 (0.07) |
| 750 | 5.73 (0.03) | 6.48 (0.08) | 6.37 (0.05) | 5.91 (0.18) | 6.09 (0.10) | 6.39 (0.04) |
| 700 | 5.91 (0.10) | 5.85 (0.03) | 5.91 (0.14) | 5.89 (0.08) | 5.83 (0.22) | 5.81 (0.7) |
| 650 | 5.62 (0.05) | 6.00 (0.04) | 5.65 (0.05) | 5.96 (0.02) | 5.90 (0.04) | 5.71 (0.11) |
| 600 | 5.58 (0.03) | 6.05 (0.04) | 5.68 (0.13) | 6.02 (0.03) | 6.00 (0.03) | 5.89 (0.07) |

AR = 5.60 (0.04)

Figure 10:
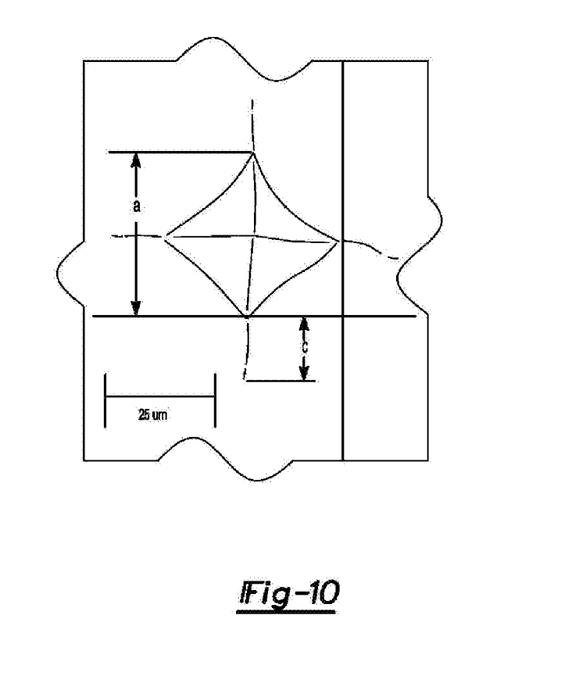
FIG. 10 is a schematic drawing illustrating a Vickers indentation on a cross sectioned glass ceramic proppant exhibiting typical corner cracking expected for brittle materials.

For indentation of brittle materials, cracks emanate from the corners of the standard Vickers indent as shown in FIG. 10. The fracture properties of a material tested in this manner can also be described by relating the crack length (c), hardness (H) and force applied by the indenter (P). In addition, the force P can be represented through a relationship of a diagonal length (a) of an indentation and the hardness of the material.

The relationship of the above measured values is properly described as the indentation fracture resistance, often reported as the fracture toughness of the material since it is calculated to carry the same units as toughness (T)—a commonly quoted material property. The value of the Vickers indentation fraction resistance (VIFR) can be determined by applying the equation of Evans and Wilshaw, shown below in Equation 1, with the VIFR in MPa per square root meter (MPa·$\sqrt{m}$) for each set of processing parameters tested shown below in Table 5.

$$\text{VIFR} = 0.1706(H\sqrt{a})\cdot\text{Log}(4.5a/c) \qquad \text{Eqn. 1}$$

TABLE 5

| | VIFR | | | | | |
|---|---|---|---|---|---|---|
| | Time (h) | | | | | |
| Temp. (C.) | 0.1 | 1 | 5 | 10 | 17 | 25 |
| 1000 | 1.49 | 1.93 | 1.68 | 2.00 | 2.50 | 2.31 |
| 950 | 1.31 | 1.74 | 1.73 | 1.90 | 1.75 | 1.47 |
| 900 | 1.39 | 1.94 | 2.19 | 2.01 | 1.63 | 1.84 |
| 850 | 1.46 | 2.18 | 1.79 | 2.09 | 1.64 | 1.76 |
| 800 | 1.15 | 1.54 | 1.52 | 1.57 | 1.65 | 1.41 |
| 750 | 1.02 | 1.77 | 1.67 | 1.12 | 1.40 | 1.17 |
| 700 | 1.23 | 1.14 | 1.59 | 0.99 | 1.21 | 1.32 |
| 650 | 1.07 | 1.04 | 0.93 | 1.47 | 0.94 | 1.43 |
| 600 | 1.09 | 1.38 | 0.92 | 1.04 | 1.00 | 1.16 |

AR = 1.18

As shown in the table, the VIFR appears to trend similarly with the fragmentation behavior of the proppants, thereby suggesting that the VIFR can be a viable metric for predicting the fragmentation behavior of devitrified glass proppants. For example, the processing parameters that provide higher values for Type 1 fragmentation (T≧750° C., all times), also generally provide similar higher values for VIFR (exceptions for T=750° C. & 800° C.–0.1 hour and T=750° C. for 10 & 25 hours noted). In contrast, an increase in strength for the particulates was observed for only 47% of the processing combinations of T≧750° C., all times.

In addition to a process for making proppants, the present invention discloses a proppant made from glass. In some instances, the proppant is made using the process disclosed above, however this is not required. The proppant is a glass particulate that has a generally spherical shape and a diameter within the range of 250 to 5000 microns, or in the alternative, a diameter within the range of 500 to 2000 microns. In addition, the proppant has improved failure properties with a Vickers indentation fracture resistance (VIFR) greater than 1.2 MPa·$\sqrt{m}$. The VIFR can be determined by the expression VIFR=0.1706(H·$\sqrt{a}$)·Log(4.5a/c) where H is a Vickers hardness value of the glass particulate, a is a diagonal length of an indentation produced on a surface of the glass particulate from a Vickers hardness test and c is a length of a crack extending from the indentation. In some instances, the VIFR for the proppant is greater than 1.5 MPa·$\sqrt{m}$ and in other instances the VIFR is greater than 1.8 MPa·$\sqrt{m}$.

In this manner, heat treating natural obsidian-like andesite glass net-shaped spheres can promote crystalline phases and manipulate the material properties specifically to adjust the failure habit and fragmentation behavior of glass based spheres. The invention is not restricted to the illustrative examples and embodiments described above. The examples are not intended as limitations on the scope of the invention. Methods, apparatus, compositions and the like described herein are exemplary and not intended as limitations on the scope of the invention. Changes therein and others will occur to those skilled in the art, and as such, it is the following claims, including all equivalents, that define the scope of the invention.

We claim:

1. A process for producing proppants, the process comprising:
    providing an amorphous spherical glass particulate derived by fusing and quenching a waste byproduct of mining in the form of an aluminosilicate mineral, the aluminosilicate mineral selected from the group consisting of rhyolite, theoliite, olivine, basalt, andesite and combinations thereof;
    heating the amorphous spherical glass particulate to a temperature greater than 600° C. for a predetermined time such that one or more crystalline phases nucleates and grows within the amorphous spherical glass particulate and produces a partially devitrified glass particulate; and
    cooling the devitrified glass particulate to ambient temperature;
    wherein the cooled devitrified glass particulate has a Vickers indentation fracture resistance (VIFR) greater than 1.2 MPa·$\sqrt{m}$;
    wherein said VIFR is determined by the expression:

$$\text{VIFR}=0.1706(H\sqrt{a})\cdot\text{Log}(4.5a/c)$$

where:
        H is a Vickers hardness value of said glass particulate;
        a is a diagonal length of an indentation produced from a Vickers hardness test; and
        c is a crack length extending from the indentation produced from the Vickers hardness test.

2. The process of claim 1, wherein the step of heating the glass particulate is heating to a temperature between 700° C. and 1050° C., inclusive.

3. The process of claim 1, wherein the crystalline phase that nucleates and grows within the amorphous glass particulate and produces a devitrified glass particulate is an iron oxide.

4. The process of claim 3, wherein the amorphous glass particulate contains between 0.5-4.5 weight percent (wt %) $Fe_2O_3$, 3-13 wt % FeO and the iron oxide is magnetite.

5. The process of claim 1, wherein the devitrified glass particulate has a fracture toughness at least 10% greater than a fracture toughness of the amorphous glass particulate.

6. The process of claim 1, wherein the devitrified glass particulate has a fracture toughness at least 25% greater than a fracture toughness of the amorphous glass particulate.

7. The process of claim 1, wherein the devitrified glass particulate has a fracture toughness at least 50% greater than a fracture toughness of the amorphous glass particulate.

8. The process of claim 1, wherein the devitrified glass particulate has a VIFR greater than 1.5 MPa·$\sqrt{m}$.

9. The process of claim 1, wherein the devitrified glass particulate has a VIFR greater than 1.8 MPa·$\sqrt{m}$.

* * * * *